United States Patent
Johnson et al.

(10) Patent No.: US 7,911,961 B2
(45) Date of Patent: *Mar. 22, 2011

(54) METHOD AND APPARATUS FOR PROVIDING PROCESSOR OCCUPANCY OVERLOAD CONTROL

(75) Inventors: Carolyn Roche Johnson, Holmdel, NJ (US); Eric Noel, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 101 days.

This patent is subject to a terminal disclaimer.

(21) Appl. No.: 12/335,166

(22) Filed: Dec. 15, 2008

(65) Prior Publication Data

US 2010/0149977 A1 Jun. 17, 2010

(51) Int. Cl.
   *G08C 15/00* (2006.01)
(52) U.S. Cl. ......... 370/236; 370/229; 370/230; 370/235
(58) Field of Classification Search .................. 370/229, 370/230, 232, 235, 236; 379/111, 112.01, 379/112.06, 112.1

See application file for complete search history.

(56) References Cited

U.S. PATENT DOCUMENTS

| | | | | |
|---|---|---|---|---|
| 5,812,533 A | * | 9/1998 | Cox et al. | 370/259 |
| 6,442,139 B1 | * | 8/2002 | Hosein | 370/236 |
| 6,445,707 B1 | * | 9/2002 | Iuoras et al. | 370/395.43 |
| 2004/0240384 A1 | * | 12/2004 | Hari et al. | 370/230 |
| 2006/0245359 A1 | * | 11/2006 | Hosein | 370/235 |
| 2009/0285099 A1 | * | 11/2009 | Kahn et al. | 370/236 |

* cited by examiner

*Primary Examiner* — Chi H Pham
*Assistant Examiner* — Weibin Huang (57) ABSTRACT

A method and apparatus for handling an overload condition in a communication network are disclosed. For example, the method calculates a call target rate by at least one core signaling network element for at least one edge signaling network element. The method then sends the call target rate by the at least one core signaling network element to the at least one edge signaling network element, when a processor occupancy of the at least one core signaling network element exceeds a predefined high threshold within a measurement interval, wherein the call target rate is used by the at least one edge signaling network element in an overload control that throttles signaling traffic.

20 Claims, 5 Drawing Sheets

METHOD AND APPARATUS FOR PROVIDING PROCESSOR OCCUPANCY OVERLOAD CONTROL

The present invention relates generally to communication networks and, more particularly, to a method and apparatus for providing processor occupancy overload control for signaling traffic in communication networks, e.g., packet networks such as Internet Protocol (IP) networks, Internet Protocol (IP) Multimedia Subsystem (IMS) networks, and Voice over Internet Protocol (VoIP) networks.

BACKGROUND OF THE INVENTION

Capacity of telephony networks is traditionally optimized to carry load during busy hour traffic while subject to some level of congestion and/or failure of network elements within a network. However, it is not engineered to account for extremely large traffic surges caused by exception events.

SUMMARY OF THE INVENTION

In one embodiment, the present invention enables a core signaling network element within a network to dynamically advertise a desired target rate to one or more edge signaling network elements actively sending signaling traffic to the core signaling network element. For example, the method calculates a call target rate by at least one core signaling network element for at least one edge signaling network element. The method then sends the call target rate by the at least one core signaling network element to the at least one edge signaling network element, when a processor occupancy of the at least one core signaling network element exceeds a predefined high threshold within a measurement interval, wherein the call target rate is used by the at least one edge signaling network element in an overload control that throttles signaling traffic.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Capacity of telephony networks is traditionally optimized to carry load during busy hour traffic while subject to some level of congestions and failures of network elements within a network. However, it is not engineered to account for extremely large traffic surges caused by exception events, such as the sudden increase in call volumes experienced after a major disaster, during contests of a highly popular television show in which viewers can participate by voting via telephony endpoint devices, or following an advertisement campaign after which a large number of customers may call to a particular number within a short period of time. To cope with such exception events, operators may rely on traditional network management capabilities to handle the sudden increase in traffic load effectively. However, in new and emerging packet based network, such as SIP based servers within IP networks, there are new challenges to be addressed. For example, the SIP protocol introduces new messages and requires a larger number of messages per call than in traditional telephony networks. In addition, routing within SIP networks often involves multiple routing choices to elements that can have varying capacities. SIP servers need to be able to protect against traffic surges, and need to maximize throughput during traffic overload.

Figure 1:
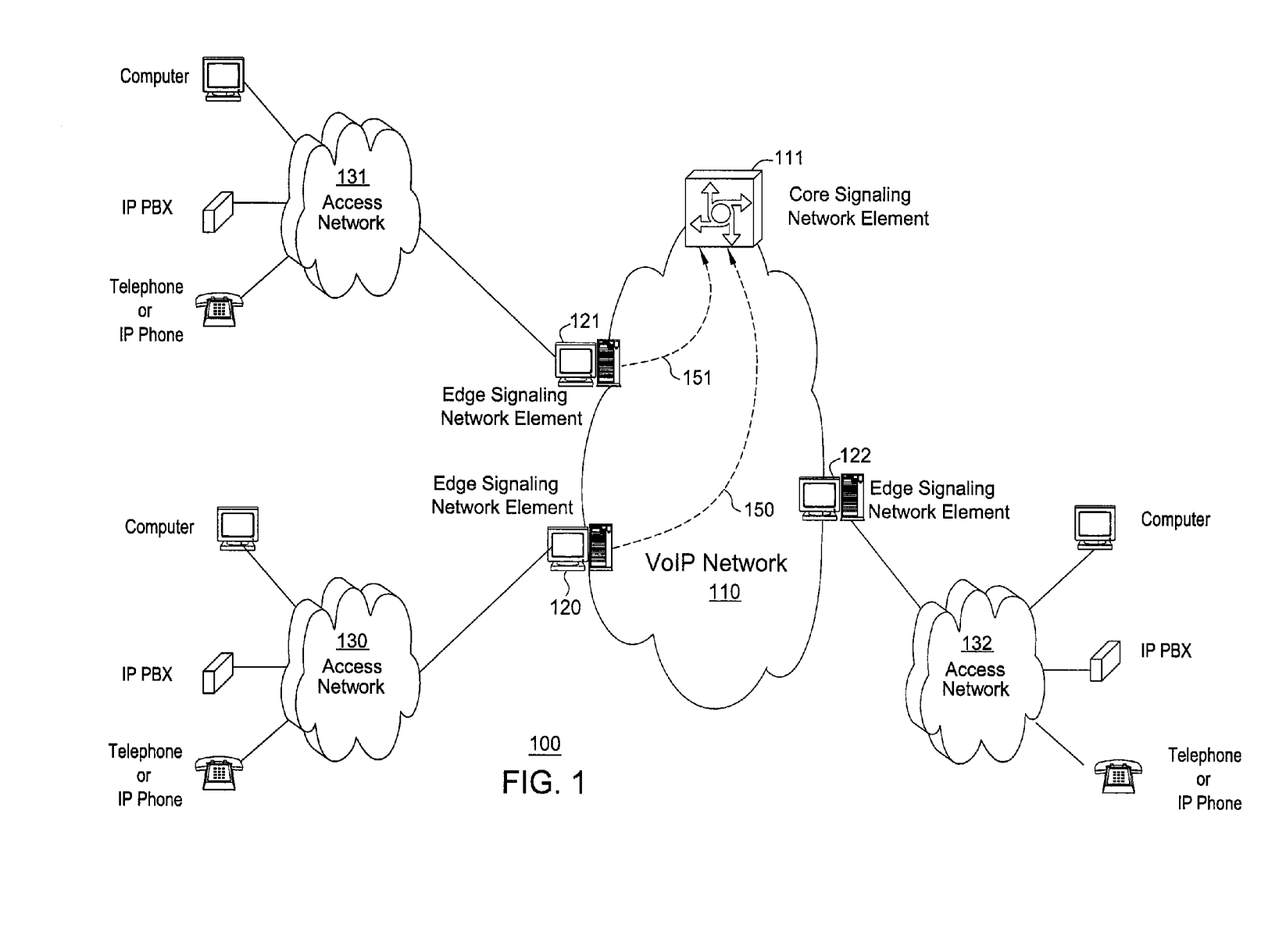
FIG. 1 illustrates an exemplary packet network, e.g., a VoIP network, related to the present invention.

To address this criticality, the present invention enables a processor occupancy overload control for signaling traffic in a packet network, e.g., an IP network, an IMS network, or a VoIP network. FIG. 1 illustrates an illustrative packet network 100, e.g., a VoIP network, related to the present invention. In FIG. 1, three edge signaling network elements 120, 121, and 122 are deployed at the edge of VoIP network 110 interconnecting access networks 130, 131, and 132, respectively. Core signaling network element 111 is interconnected with edge signaling network elements 120, 121, and 122 via the VoIP network 110. In general, a plurality of core signaling network elements and a plurality of edge signaling networks can exist in VoIP network 110.

Note that examples of an edge signaling network element include a Media Gateway or a Session Border Controller that performs signaling, media control, security, and call admission control and related functions for calls originated from an access network and to be processed by a core signaling network element. The core signaling network element resides within the packet core infrastructure and communicates with the edge signaling network elements using e.g., the Session Initiation Protocol (SIP) over IP within the underlying VoIP network 110.

The core signaling network element 111 can be implemented for example as a Media Gateway Controller, a Softswitch, an Application Server, or a Call Session Control Function (CSCF) in an Internet Protocol Multimedia Subsystem (IMS) network and performs network wide call control related functions.

SIP is an example signaling protocol used between signaling network elements, and is discussed here to illustrate a signaling communications network. Broadly defined, SIP is an Internet Engineering Task Force (IETF) signaling protocol standard for creating, modifying, and terminating call sessions. These sessions include, but are not limited to, internet telephone calls, multimedia distributions, and multimedia conferences etc. SIP invitations (used to create sessions) carry session descriptions that allow entities to agree on a set of compatible media types. SIP makes use of elements called proxy servers to help route call requests, authenticate and authorize users for services, implement provider call-routing policies, and provide features to users. In FIG. 1, edge signaling network elements 120, 121, and 122 are edge proxies and core signaling network element 111 is a core proxy according to the SIP protocol standard. IMS is an architectural framework for delivering Internet Protocol (IP) multimedia to mobile users defined by the standard body, 3rd Generation Partnership Project (3GPP).

In one example, during an exception event in which a large volume of calls are placed by callers destined to access network 132, edge signaling network elements 120 and 121 process call requests originating from access networks 130 and 131 and forward the requests to core signaling network element 111 for further processing using flows 150 and 151, respectively. If the total call volume far exceeds the processing capacity of the core signaling network element 111, core signaling network element 111 can become so congested that it results in a catastrophic failure in which no calls can be processed at all. In this case, call requests destined to edge signaling network element 122 will not be processed by core signaling network element 111 for call completion to access network 132.

Figure 2:
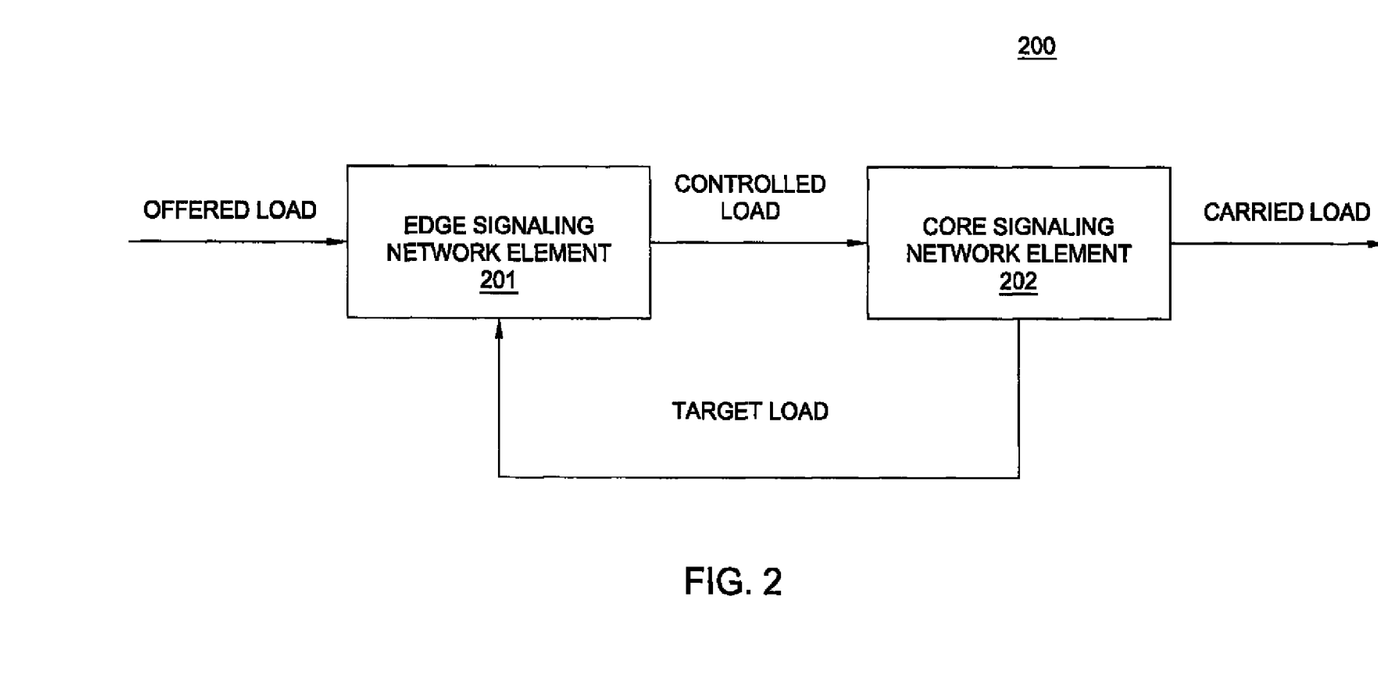
FIG. 2 illustrates an exemplary processor occupancy overload control system related to the present invention.

FIG. 2 illustrates an illustrative processor occupancy overload control system 200 related to the present invention. In order to prevent the aforementioned catastrophic failures from happening at a core signaling network element, the present invention enables edge signaling network elements to reject traffic on behalf of the core signaling network element. In FIG. 2, an offered load of rate $\lambda_{offered}$ arrives at edge signaling network element 201. Under overload conditions, the target load of rate $\lambda_{target}$, advertised by and received from core signaling network element 202, is used by edge signaling network element 201 to dynamically reduce the offered load of rate $\lambda_{target}$ into the controlled load of rate $\lambda_{control}$ load to be sent to the core signaling network element 202 for processing. The feedback mechanism allows the core signaling network element 202 to signal to the edge signaling network element 201 the desired target rate at which signaling traffic is to be sent by edge signaling network element 201 so that the core signaling network element 202 will not be overloaded.

Figure 3:
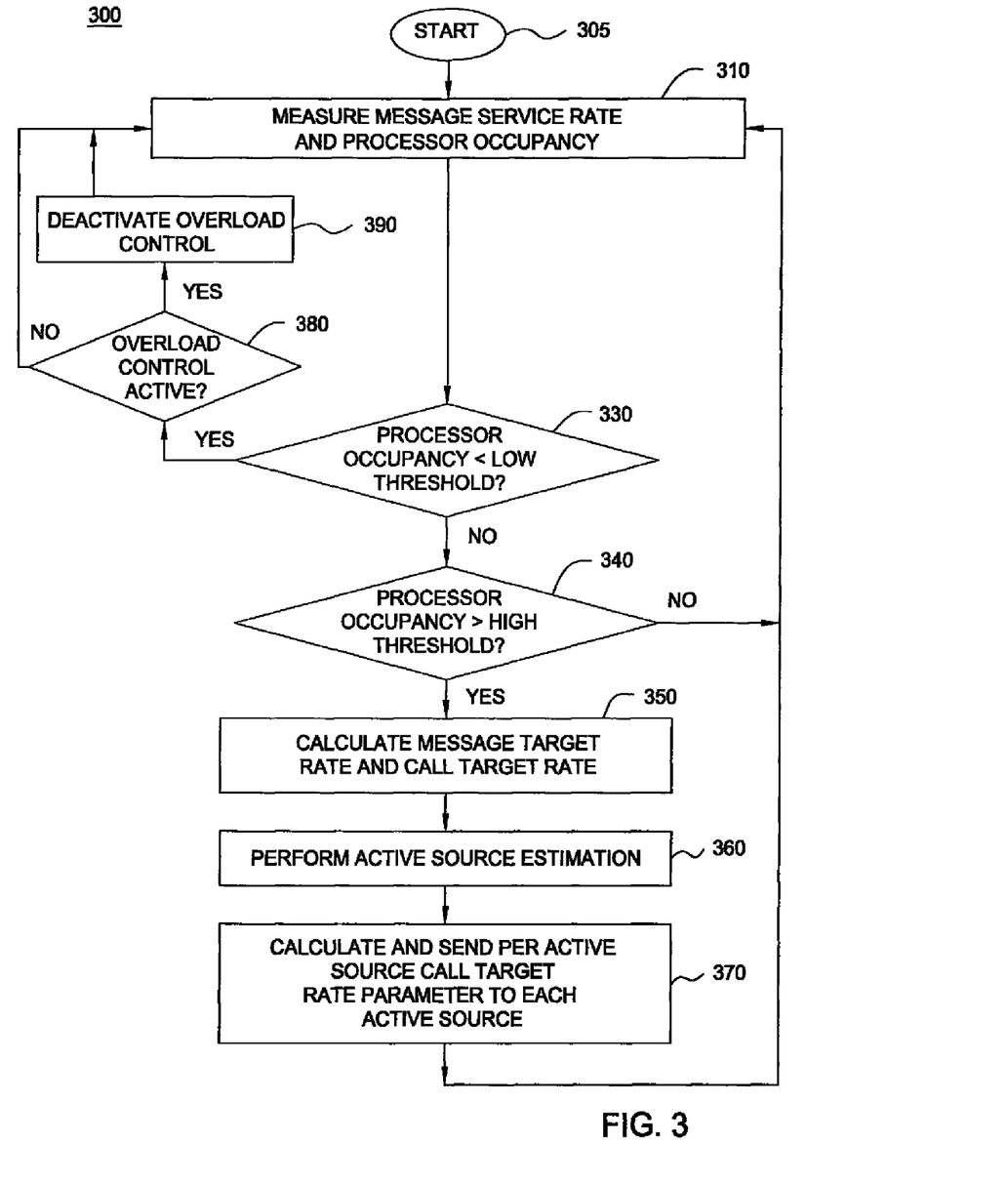
FIG. 3 illustrates a flowchart of a method for providing processor occupancy overload control in a packet network, e.g., a VoIP network, of the present invention.

FIG. 3 illustrates a flowchart of a method 300 for processor occupancy overload control in a packet network, e.g., a VoIP network, of the present invention. For example, one or more steps of method 300 can be performed by a core signaling network element. Method 300 is executed by the core signaling network element. Method 300 starts in step 305 and proceeds to step 310.

In step 310, in measurement interval t, the method measures the message service rate, $\mu_t$, (e.g., in units of messages per second) and estimates the processor occupancy, $PO_t$, of the core signaling network element. The message service rate is calculated by dividing the number of signaling messages processed in a predefined time interval T by the total busy processor time within T.

In one embodiment, the processor occupancy is calculated by dividing the duration busy processor time by the predefined time interval T. Note also that $PO_t$ is a smoothed estimate, for example Exponentially Weighted Moving Average (EWMA), with user configurable weight w, e.g., set to 0.8 in one illustrative embodiment. Note that other known smoothing algorithms can be used to estimate $PO_t$. Similarly, $\mu_t$ could also have been smoothed through EWMA or an equivalent algorithm. Note that T is a user configurable parameter representing the duration of sampling interval t and is set to 0.1 seconds in one illustrative embodiment. The minimum value of $\mu_t$ is zero. It should be noted that the various values that are provided above are only illustrative and should not be interpreted as a limitation of the present invention. Namely, these values can be selected in accordance with the requirements of a particular implementation.

In step 330, the method checks if the measured processor occupancy, $PO_t$, is below a predefined low threshold. If the processor occupancy is below the predefined low threshold, the method proceeds to step 380; otherwise, the method proceeds to step 340. In one embodiment, the predefined low threshold is calculated by multiplying a predefined low watermark factor, $\beta$, with a predefined target processor occupancy parameter, $PO_e$, where $\beta$ and $PO_e$ are user configurable parameters that can be set to 0.1 and 0.95, respectively, for example.

In step 340, the method checks if the measured processor occupancy, $PO_t$, exceeds a predefined high threshold. If the processor occupancy has exceeded the predefined high threshold, the method proceeds to step 350; otherwise, the method proceeds back to step 310 to process the next measurement time interval. In one embodiment, the predefined high threshold is calculated by multiplying a predefined high watermark factor, $\alpha$, with a predefined target processor occupancy parameter, $PO_e$, where $\alpha$ and $PO_e$ are user configurable parameters that can be set to 0.9 and 0.95, respectively, for example.

In step 350, the method calculates a message target rate for processor occupancy overload control purposes. In one embodiment, the message target rate, $\lambda_t$, is calculated by multiplying the service rate, $\mu_t$, measured in step 310 with the predefined target processor occupancy parameter, $PO_e$, where $PO_e$ is a user configurable parameter typically set to 0.95.

The message target rate is a desired signaling message service rate (e.g., measured in units of messages per second) at or below which the core signaling network element is targeted for processing incoming signaling messages from a plurality of edge signaling network elements. The calculated message target rate is further divided by the estimated messages per call parameter, $r_t$, to obtain the call target rate, $\lambda_t/r_t$, (e.g., measured in units of calls per second).

The call target rate is the desired call service rate (e.g., measured in units of calls per second) at or below which the core signaling network element is targeted for processing incoming calls from a plurality of edge signaling network elements. In essence, $r_t$ is an Exponentially Weighted Moving Average (EWMA) estimate derived by dividing the measured incoming message rate by the measured incoming call rate. Note that EWMA is just one method of estimation; any known estimation method can be used.

It should be noted that message and call rates are the counts of incoming messages and calls during the measurement interval T. It should be noted that any method for estimating messages per call can be used. The weight, w, used in calculating the EWMA estimate of $r_t$ is a user configurable parameter, for example set to 0.8. It should be noted that EWMA or any equivalent smoothing algorithm can be used.

In step 360, the method performs active source estimation to obtain the number of active sources, e.g., active edge signaling network elements, currently sending call signaling messages to a core signaling network element for processing. In one embodiment, the number of active source estimate at measurement interval t is defined by:

$A_t = w*A_{t-1} + (1-w)*A_{t-1}*N_{t-1}/(T*\lambda_{t-1}/r_{t-1})$, where $A_{t-1}$ is the number of active source estimate at the (t−1) measurement interval, $N_{t-1}$ is the number of new call attempts during the (t−1) measurement interval, $\lambda_{t-1}/r_{t-1}$ is the call target rate during the last measurement interval, measurement interval t−1, and w is the user configurable EWMA weight, w, typically set to 0.8 for illustration. Note again that EWMA is used only for illustration; any known smoothing algorithm can be used. The expression $(T*\lambda_{t-1}/r_{t-1})/A_{t-1}$ is the expected number of calls per active source and $A_{t-1}*N_{t-1}/(T*\lambda_{t-1}/r_{t-1})$ is the updated number of active sources in measurement interval t−1.

It should be noted that the above example illustrates one possible way to estimate the number of active sources. However, an alternate way is to track call request origination and received load from each source.

In step 370, the method calculates the per active source call target rate by dividing the call target rate, $\lambda_t/r_t$, by the estimated number of active sources, $A_t$, for measurement interval t. The method then sends or advertises the per active source call target rate to each of the active sources, e.g., each active edge signaling network element currently sending call signaling messages to the core signaling network element. The method then proceeds back to step 310 to process the next measurement time interval.

In step 380, the method checks if overload control is already active. If the overload control is already active, the method proceeds to step 390; otherwise, the method proceeds back to step 310 to process the next measurement time interval.

In step 390, the method deactivates the overload control by sending a deactivation message to each of the active sources, e.g., edge signaling network elements, to stop throttling signaling traffic sent to the core signaling network element. The method then proceeds back to step 310 to process the next measurement time interval.

Figure 4:
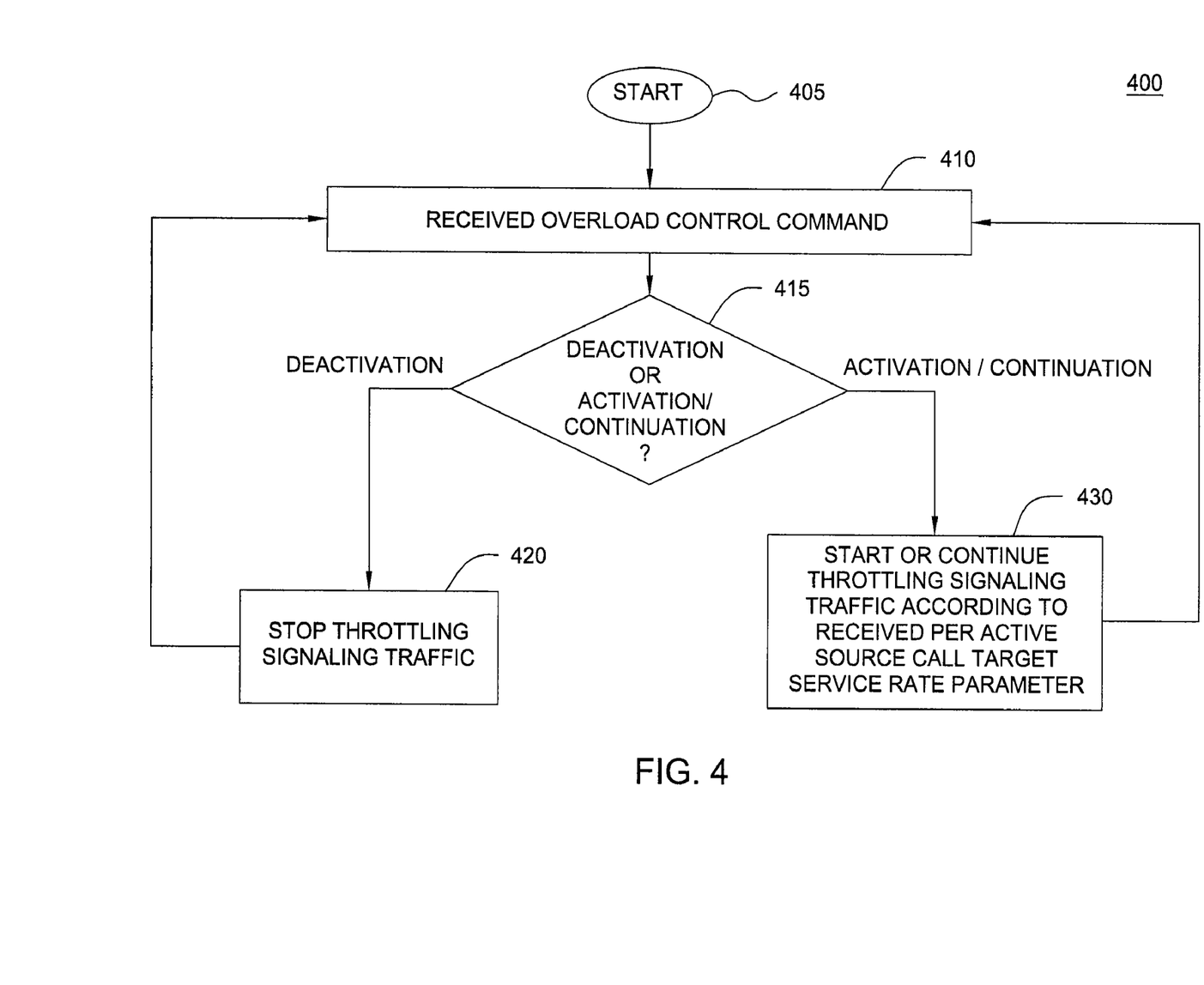
FIG. 4 illustrates a flowchart of a method for processing overload control messages in a packet network, e.g., a VoIP network, of the present invention.

FIG. 4 illustrates a flowchart of a method 400 for processing overload control messages in a packet network, e.g., a VoIP network, of the present invention. For example, one or more steps of method 400 can be executed by an active edge signaling network element. Method 400 starts in step 405 and proceeds to step 410.

In step 410, the method receives an overload control message from a core signaling network element.

In step 415, the method determines whether the overload control message comprises a deactivation command or an activation command or a continuation command. If the received overload control message is a deactivation command, the method proceeds to step 420. If the received overload control message is an activation command or a continuation command, the method proceeds to step 430.

In step 420, the method stops throttling signaling traffic toward the core signaling network element from which the deactivation overload control message is received. The method then proceeds back to step 410.

In step 430, the method either starts or continues to throttle signaling traffic toward the core signaling network element from which the activation or continuation overload control message is received. In one embodiment of the present invention, the edge signaling network element throttles offered signaling traffic toward the core signaling network element based on a blocking percentage derived from the per active source call target rate parameter just received from the core signaling network element in the overload control message. In another embodiment of the present invention, the edge signaling network element throttles offered signaling traffic toward the core signaling network element using a leaky bucket algorithm according to the per active source call target rate parameter received from the core signaling network element. Furthermore, blocking algorithms such as window algorithms, or gap algorithms can also be used. The method then proceeds back to step 410.

It should be noted that although not specifically specified, one or more steps of methods 300 and 400 may include a storing, displaying and/or outputting step as required for a particular application. In other words, any data, records, fields, and/or intermediate results discussed in the methods 300 and 400 can be stored, displayed and/or outputted to another device as required for a particular application. Furthermore, steps or blocks in FIGS. 3 and 4 that recite a determining operation, or involve a decision, do not necessarily require that both branches of the determining operation be practiced. In other words, one of the branches of the determining operation can be deemed as an optional step.

Note that the edge signaling network element throttles signaling traffic at the call level. In other words, the edge signaling network element rejects signaling messages on a combination of call and signaling message basis. Each call consists of a variable number of signaling messages that depend on the call completion scenario. For example, the edge signaling network element may reject the messages based on the type of signaling message for any given call. This allows the ability to give priority to messages related to calls that are already in progress and discarding only new call messages.

In the case of multiple core signaling network elements exist in a network, an edge signaling network element maintains a separate overload control per active source call target rate parameter for each of the core signaling network elements. Each edge signaling network element throttles offered load based on its most recently received per active source call target rate from a core signaling network element.

To communicate overload control messages between edge and core signaling network elements, either of two communication channels can be used between each corresponding edge and core signaling network elements. For example, a high reliability low latency dedicated out-of-band communication channel where core signaling network element broadcasts overload control related messages during each control interval C, where C is a user configurable parameter that can be set to 0.1 seconds for illustration, can be used. Alternatively, an existing signaling messages sent by the core signaling network element toward edge signaling network element whose overhead is augmented with a field for overload control related commands can also be used.

To protect against failures in the overload control communications between edge and core signaling network elements, a controlled command time to live parameter, CCTTL, is used to halt overload control by edge signaling network elements if no overload control related messages are received before the CCTTL timer expires. The CCTTL parameter is a user configurable parameter typically set to 1 second.

Figure 5:
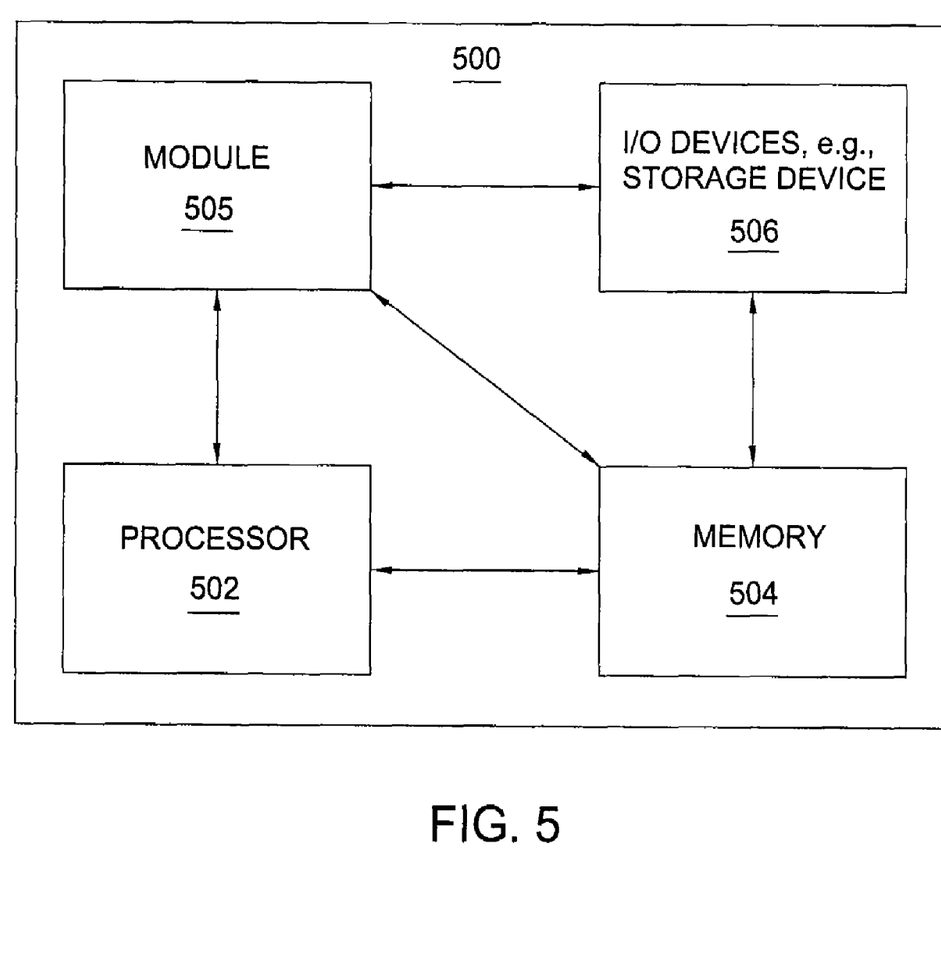
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing processor occupancy overload control, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing processor occupancy overload control can be loaded into memory 504 and executed by processor 502 to implement the functions as discussed above. As such, the present process 505 for providing processor occupancy overload control (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for handling an overload condition in a communication network, comprising:
    calculating a per active source call target rate by a core signaling network element for an edge signaling network element;
    sending the per active source call target rate by the core signaling network element to the edge signaling network element, when a processor occupancy of the core signaling network element exceeds a predefined high threshold within a measurement interval, wherein the per active source call target rate is used by the edge signaling network element in an overload control that throttles signaling traffic; and
    deactivating the overload control by instructing the edge signaling network element to stop throttling the signaling traffic if the processor occupancy of the core signaling network element drops below a predefined low threshold within the measurement interval, wherein the predefined low threshold is calculated by multiplying a predefined low watermark factor, $\beta$, with a predefined target processor occupancy parameter, $PO_e$, and where the predefined high threshold is calculated by multiplying a predefined high watermark factor, $\alpha$, with the predefined target processor occupancy parameter, $PO_e$.

2. The method of claim 1, wherein the communication network comprises a packet network.

3. The method of claim 1, wherein the processor occupancy is calculated by dividing a duration busy processor time by the measurement interval.

4. The method of claim 1, where the processor occupancy comprises an estimate.

5. The method of claim 1, wherein the per active source call target rate is calculated by dividing a desired call target rate for the core signaling network element by a number of active edge signaling network elements interconnected with the core signaling network element.

6. The method of claim 5, wherein the desired call target rate for the core signaling network element is calculated by dividing a message target rate, $\lambda_t$, by an estimated messages per call parameter, $r_t$, to obtain the desired call target rate for the core signaling network element, $\lambda_t/r_t$.

7. The method of claim 1, wherein the throttling by the edge signaling network element is performed at a call level.

8. The method of claim 1, wherein the edge signaling network element maintains a separate overload control for each of a plurality of per active source call target rate parameters for each of a plurality of core signaling network elements in the communication network.

9. The method of claim 1, wherein the per active source call target rate is sent using a dedicated out-of-band communication channel.

10. The method of claim 1, wherein the edge signaling network element throttles an offered load based on the per active source call target rate that is most recently received from the core signaling network element, and halts throttling if a next per active source call target rate is not received within a predefined controlled command time to live time value.

11. The method of claim 1, wherein the edge signaling network element throttles the signaling traffic toward the core signaling network element based on a blocking algorithm.

12. The method of claim 1, wherein the per active source call target rate is sent within a signaling message.

13. The method of claim 11, wherein the blocking algorithm comprises a gap algorithm.

14. The method of claim 11, wherein the blocking algorithm comprises a leaky bucket algorithm.

15. A method for handling an overload condition in a communication network, comprising:
    calculating a per active source call target rate by a core signaling network element for an edge signaling network element; and
    sending the per active source call target rate by the core signaling network element to the edge signaling network element, when a processor occupancy of the core signaling network element exceeds a predefined high threshold within a measurement interval, wherein the per active source call target rate is used by the edge signaling network element in an overload control that throttles signaling traffic, wherein the per active source call target rate is calculated by dividing a desired call target rate for the core signaling network element by a number of active edge signaling network elements interconnected with the core signaling network element, wherein the desired call target rate for the core signaling network element is calculated by dividing a message target rate, $\lambda_t$, by an estimated messages per call parameter, $r_t$, to obtain the desired call target rate for the core signaling network element, $\lambda_t/r_t$, wherein the message target rate, $\lambda_t$, is calculated by multiplying a message service rate, $\mu_t$, with a predefined target processor occupancy parameter, $PO_e$, and where the message service rate, $\mu_t$, is calculated by dividing a number of signaling messages processed in the measurement interval by a total busy processor time within the measurement interval.

16. The method of claim 15, wherein the estimated messages per call parameter, $r_t$, is an estimate derived by dividing a measured incoming message rate by a corresponding measured incoming call rate.

17. A non-transitory computer-readable medium having stored thereon a plurality of instructions, the plurality of instructions including instructions which, when executed by a processor, cause the processor to perform a method for handling an overload condition in a communication network, comprising:
    calculating a per active source call target rate by a core signaling network element for an edge signaling network element;
    sending the per active source call target rate by the core signaling network element to the edge signaling network element, when a processor occupancy of the core signaling network element exceeds a predefined high threshold within a measurement interval, wherein the per active source call target rate is used by the edge signaling network element in an overload control that throttles signaling traffic; and
    deactivating the overload control by instructing the edge signaling network element to stop throttling the signaling traffic if the processor occupancy of the core signaling network element drops below a predefined low threshold within the measurement interval, wherein the predefined low threshold is calculated by multiplying a predefined low watermark factor, $\beta$, with a predefined target processor occupancy parameter, $PO_e$, and where the redefined high threshold is calculated by multiplying a predefined high watermark factor, $\alpha$, with the predefined target processor occupancy parameter, $PO_e$.

18. The non-transitory computer-readable medium of claim 15, wherein the processor occupancy is calculated by dividing a duration busy processor time by the measurement interval.

19. The non-transitory computer-readable medium of claim 17, wherein the per active source call target rate is calculated by dividing a desired call target rate for the core signaling network element by a number of active edge signaling network elements interconnected with the core signaling network element.

20. An apparatus for handling an overload condition in a communication network, comprising:
   means for calculating a per active source call target rate by a core signaling network element for an edge signaling network element;
   means for sending the per active source call target rate by the core signaling network element to the edge signaling network element, when a processor occupancy of the core signaling network element exceeds a predefined high threshold within a measurement interval, wherein the per active source call target rate is used by the edge signaling network element in an overload control that throttles signaling traffic; and
   means for deactivating the overload control by instructing the edge signaling network element to stop throttling the signaling traffic if the processor occupancy of the core signaling network element drops below a predefined low threshold within the measurement interval, wherein the predefined low threshold is calculated by multiplying a predefined low watermark factor, $\beta$, with a predefined target processor occupancy parameter, $PO_e$, and the predefined high threshold is calculated by multiplying a predefined high watermark factor, $\alpha$, with the predefined target processor occupancy parameter, $PO_e$.

* * * * *